Dec. 25, 1928.　　　　　　　　　　　　　　　　　　1,696,704
H. G. ZELLNER
COMPOSITION FOR TREATING FRESH FRUITS AND VEGETABLES
Filed April 23, 1926　　　3 Sheets-Sheet 1
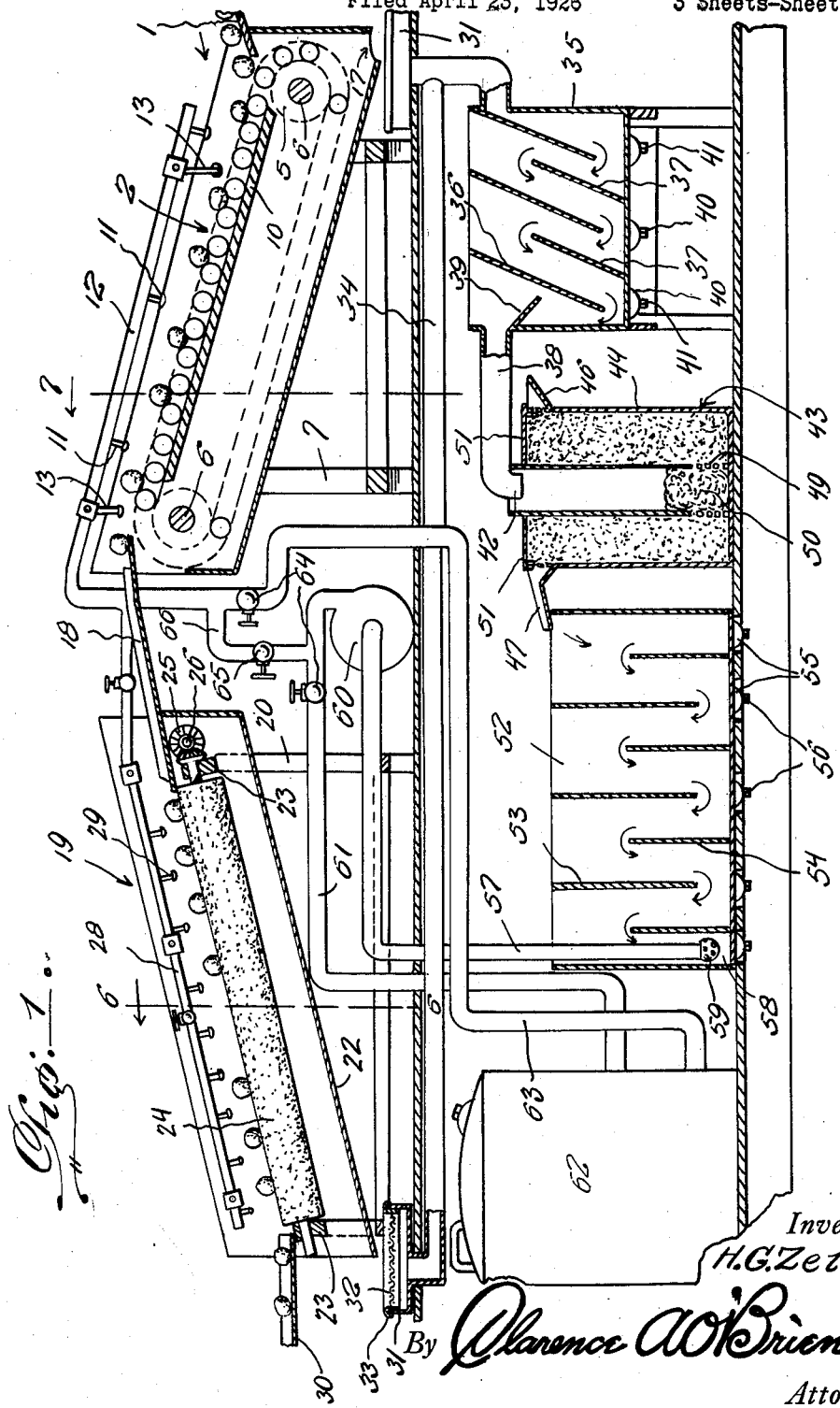
Inventor
H. G. Zettner
By Clarence A. O'Brien
Attorney

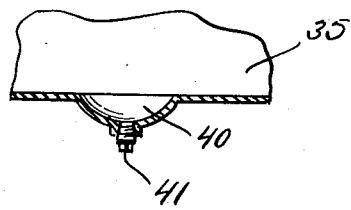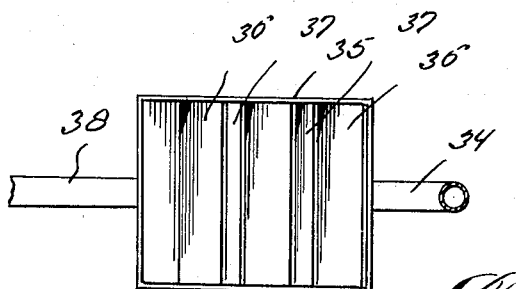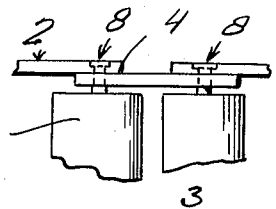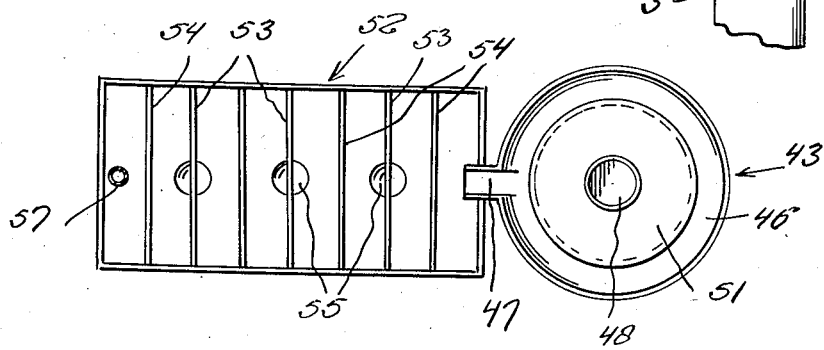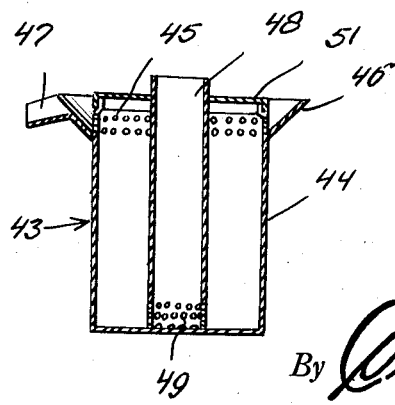

Dec. 25, 1928.
H. G. ZELLNER
1,696,704
COMPOSITION FOR TREATING FRESH FRUITS AND VEGETABLES
Filed April 23, 1926  3 Sheets-Sheet 3
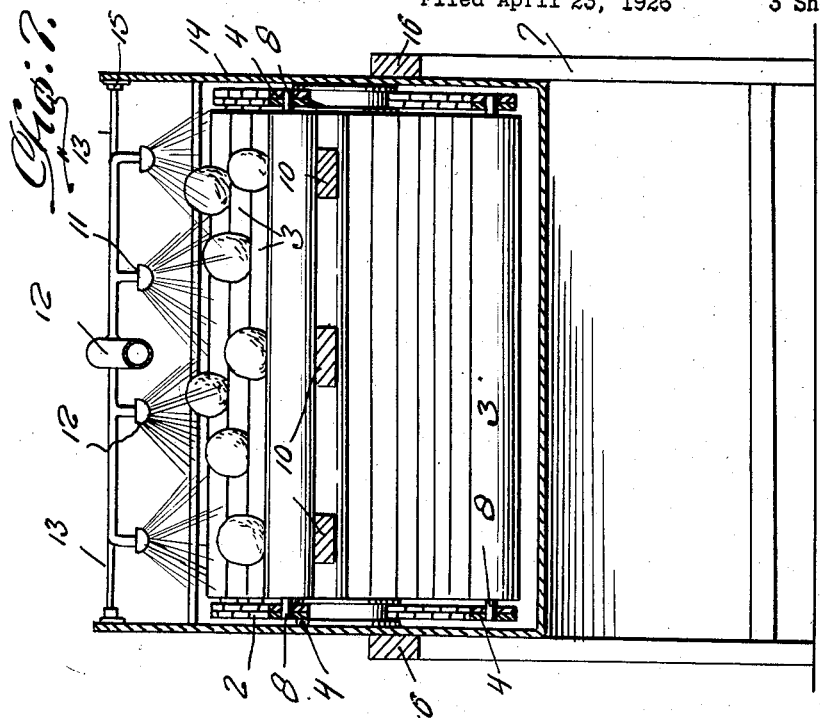
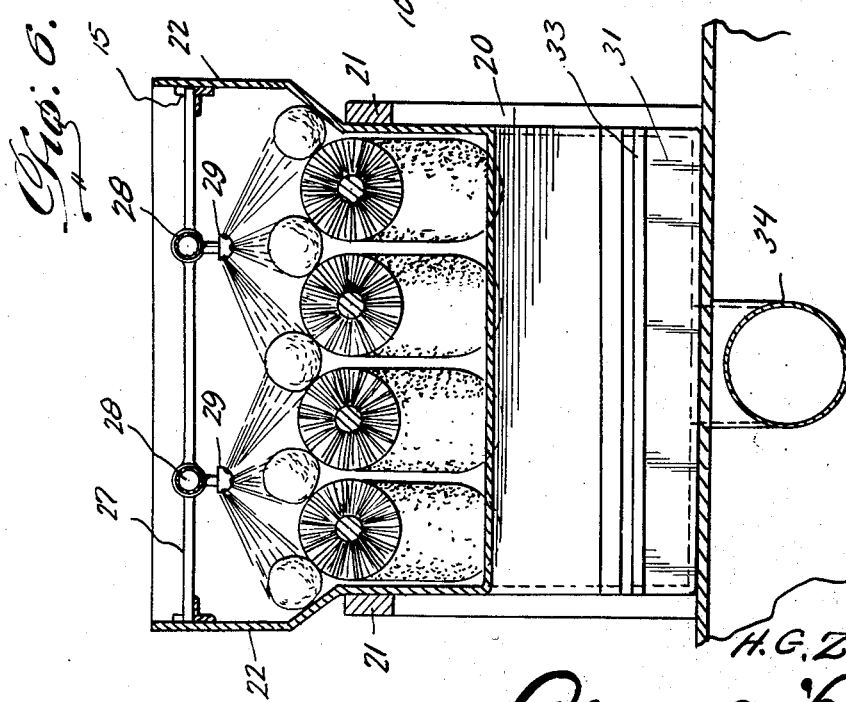
Inventor
H. G. Zellner
By Clarence A. O'Brien
Attorney Patented Dec. 25, 1928.

1,696,704

UNITED STATES PATENT OFFICE.

HENRY GRADY ZELLNER, OF FORT MYERS, FLORIDA, ASSIGNOR TO ZELTROCIDE CHEMICAL CORPORATION, OF LAKELAND, FLORIDA, A CORPORATION OF FLORIDA.

COMPOSITION FOR TREATING FRESH FRUITS AND VEGETABLES.

Application filed April 23, 1926. Serial No. 104,143.

This invention relates to a process, apparatus, and a composition for treating fresh fruits and vegetables during the preparation of the same for market, which is designed more particularly to allay or prevent the destructive decay resulting particularly from blue mold, green mold, stem end rot, anthracnose, and contact mold, and to preserve and enhance the value of the fruits for market.

In the citrus fruit industry, the fruit is clipped from the tree with a portion of the stem remaining thereon, and before shipping, is subjected to a washing, scrubbing, drying and polishing treatment to cleanse and polish the fruit in preparation for the market, and following which the fruit is graded before being packed for shipping to the market.

In the picking, packing, and handling of the fruit or vegetables, a substantial amount becomes scratched, picked, scarred, or the skin otherwise fractured or broken, which is in many cases, very minute, so small in some instances that it is not noticeable to the naked eye, but sufficient to permit the destruction of the fruit or vegetable due to the action of blue mold, green mold, stem end rot, and anthracnose and contact mold, or other diseases.

During the washing process for cleaning the fruit, it will be seen that infected fruits will infect the wash water and washing machinery in which the fruit or vegetables are washed, and that substantially all of the fruit passing through the wash water and washing machinery will become infected with these diseases which will cause the decay of the fruit in a very short period of time, as a result of which large losses on the part of the shipping of citrus fruit and vegetables are experienced under present conditions.

The present invention has been designed after lengthy experimentation and study of the conditions effecting the decay of fruit and vegetables during shipment and has resulted in the provision of an improved method of treating the fruit and vegetables including spraying, scrubbing, and drying with a special chemical solution having the properties for allaying or preventing destructive action of blue mold, green mold, stem end rot, anthracnose, and contact mold as well as other forms of diseases and decay.

The invention therefore comprehends the provision of a new process of treatment for fresh fruits and vegetables in which the fruit is continuously fed through a spray under pressure while being continuously rotated so that the entire surface of all of the fruits will be thoroughly impregnated with the spray from a suitable chemical solution adapted to cleanse and preserve the fruit, and following the first spraying treatment is then subjected to further treatment under a spray of the same chemical solution with simultaneous scrubbing of the entire surfaces to thoroughly cleanse and impregnate the pores of the fruit with the chemical solution.

The invention further comprehends the provision of a method of treating fluid used in connection with the treatment of fruits for market in which the fluid is provided for spraying under pressure on the fruit and vegetables to be treated for removing foreign matter, germs, etc. from the surfaces and pores of the fruit, in which the liquid or fluid is normally circulated from a suitable source of supply to the spray under pressure and then collected and subjected to a series of settlings and filtering treatments for removing the various foreign matter and other substances from the fluid, which would be taken up in spraying the fruits, and subsequently re-delivering the filtered and treated fluid to the supply for re-use in the spray so that a predetermined quantity of the fluid may be used over and over through continuous circulation and treatment in accordance with this method for effectively treating a large amount of fruit and vegetables, and thereby conserving the cost of using the process to the packer and shipper to a minimum.

In addition, the invention comprehends the improvements in the various apparatus used for the treatment of the fruits and the chemical solution used which are each of special design for efficiently carrying out the method of treatment above set forth.

The invention comprehends other objects and improvements residing in the particular method of treating the fruits and the fluid used in connection with the special composition of said fluid, which are all more particularly pointed out in the following detailed description and claim directed to the preferred method and apparatus for using the composition, it being understood, however, that various changes may be made without departing from the spirit and scope of the invention as herein set forth.

In the drawings forming part of this application:—

Figure 1 is a vertical sectional view through the apparatus for treating the fruit and liquid used in which the various parts of the apparatus are shown in a somewhat diagrammatic arrangement for the purpose of a clear illustration of the method of treating the fruits and also the liquid with the structural features of the apparatus.

Fig. 2 is a plan view of the primary settling tank,

Fig. 3 is a plan view of the primary filter and secondary settling and fluid supply tank.

Fig. 4 is a vertical detail section showing the primary filter construction.

Fig. 5 is an enlarged detail sectional view taken on line 5—5 of Fig. 1 showing one of the sediment outlets of the primary and secondary settling tanks.

Fig. 6 is a vertical sectional view taken on the line 6—6 of Fig. 1.

Fig. 7 is a vertical sectional view taken on the line 7—7 of Fig. 1.

Fig. 8 is a detail view showing a portion of the endless conveyor.

The composition of the chemical solution used in connection with this invention for the treatment of fresh fruits and vegetables is the result of long and careful experiment with numerous substances and compositions as a result of which it has been found that the composition having the following ingredients in their respective proportions is best suited for the treatment of fruits and vegetables:

100 lbs. borax.
20 lbs. sodium bicarbonate.
18 lbs. sodium carbonate.
2 lbs. potassium permanganate.
1 lb. 8 oz. copper sulphate.

In the preparation of the composition, the ingredients as above stated and in the approximate proportions given, which has been found best suitable for the purpose, although they may be varied to a considerable degree with efficient results, are thoroughly mixed in dry form following which they are ready for use in the preparation of a solution for treating the fruit and vegetables. The mixture is dissolved in a suitable quantity of water to prepare a solution of from two to twelve per cent strength. It has been found from experience, that a solution of approximately six per cent strength is best suited for the treatment of fruits and vegetables. From experience, it has been further found that a solution of approximately six per cent strength will efficiently treat thirty carloads of fruit and vegetables when prepared in 250 gallon batches. This use of a relatively small amount of fluid for the treatment of such a large amount of fruit results principally from the method of applying and using the fluid forming part of the subject matter of this invention.

It has been found from experiment that the use of borax alone will allay and prevent an attack of blue mold, and reduce the destructive decay thereof about 72%, but that numerous other infections and diseases are not affected. In addition, the use of borax alone leaves a very undesirable white powder deposit on the surface of the fruit which injures to some extent the natural gloss and appearance of the fruit and is difficult to remove. In this way it has been found that the use of borax alone is not practical as it reduces the marketable value of the fruit. In addition, it is found that in the shipment of fruits treated merely with borax, five per cent solution, that on twenty days' shipment, the decay amounted to substantially forty per cent, which reduces the decay in the shipment of fruit under ventilation only a relatively small amount in comparison with shipments under refrigeration without treatment.

It has been found with the above composition forming part of the subject matter of the present invention that the percentage of decay in twenty days' shipment is substantially reduced to a relatively small amount, approximately three per cent The treatment with the composition as above stated, resulting from the ingredients used prevents formation of a coating on the fruit and also the injuring of the natural appearance thereof, as a result of which, the saleable value on the market is enhanced. It has been further found that this composition cooperates to eliminate substantially all forms of molds and decay is such as blue mold, green mold, contact mold, anthracnose, and stem end rot. In this way a clean, clear and yet thoroughly treated product is produced which will be well preserved for a substantial length of time, which as a result will command the best market price.

It has been further found that the composition as above stated, can be changed by substituting sodium monoborate and sodium sesquicarbonate in varying proportions instead of the borax sodium bicarbonate and sodium carbonate as above stated. The principal difference found to exist in this substitution is the cost of the material and not in the results produced which are substantially similar in all respects to that of the preferred composition stated above.

In treating the fruit with the solution of the composition in the manner stated above, it is delivered continuously over the conveyor 1 shown in Fig. 1, preferably in the form of an inclined chute or board to the endless conveyor 2 formed of a plurality of rollers 3 rotatably mounted in the interconnected links 4 forming endless elements of which a pair are used in mounting in spaced parallel relation on suitable sprockets 5 mounted on the shafts 6 which are suitably rotatably supported in bearings in the main frame work 7. These rollers 3 as clearly shown in Fig. 8, in addition to being rotatably mounted in the links 4 have their axes constructed so as to provide the pivot connection as indicated at 8 in Fig. 8, between each pair of links in the formation of the chain.

This endless conveyor has a pair of parallel flights as shown in Fig. 1, the upper flight of which receives the fruit and which inclines upwardly from below the chute 1. The upper flight of the conveyor in traveling upwardly in the inclined relation from the chute 1 to the upper end of the machine is continuously rotated thru the engagement of the rollers with the strip 10 on which they ride and continuously rotate. During this travel of the fruit through the machine it is thoroughly sprayed with fluid formed in the manner above stated from the spray nozzles 11 positioned over the conveyor 2 and carried by the distributing pipe 12 suitably supported by the bracket 13 secured to the sides of the drip pan 14 as clearly shown in Fig. 7 at 15, which is mounted in the inclined relation shown in Fig. 1, in the frame 7, and between the side bars 16 thereof. This provides the first step in the method and process and treatment for the purpose of removing the major portion of the dirt, spores, and other matters adhering to the surface of the fruit or vegetables which are washed into the drip pan 14 and flow downwardly and through the outlet 17 at the lower end thereof.

After this preliminary or first washing treatment, the fruit is delivered onto the chute 18 secured to the upper end of the inclined strip pan 14 and the opposite end from the chute 1 which conveys the treated fruit into the upper end of the inclined spraying and scrubbing apparatus 19 for a further treatment therein. This apparatus 19 includes a framework 20 having side bars 21 between which is mounted the inclined drip pan 22 having the side wall thereof extending substantially above the side bars 21 as shown in Fig. 6. The bottom of the pan 22 is inclined from the forward to the rear end which is at the lowermost point and provided with an open end to discharge the liquid received therein. The side bars 21 of the frame 20 are connected adjacent their opposite ends by cross bars 23 clearly shown in Fig. 1, provided with suitable bearings for mounting a plurality of scrubbing brushes 24 extending longitudinally in the frame work in adjacent and parallel relation as shown in Fig. 6, and mounted for rotation by means of gearing 25 driven from the drive shaft 26 operated in any suitable manner most desirable for the purpose.

The upper edges of the sides of the drip pan 22 are provided with suitable brackets 27 which carry the supply pipes 28 for a plurality of spray nozzles 29 arranged in a predetermined manner, so as to supply chemical fluid under pressure over the entire upper surface of the brushes and the fruit travelling thereon, and effectively and forcibly spray the chemical treating solution over the entire surfaces of all fruits and vegetables being treated during the travel through the apparatus 19 and with simultaneously brushing and scrubbing thereof.

This second step of treatment for the cleaned fruits from the washing and spraying apparatus provides for the thorough cleansing of the fruits and the thorough impregnation of the pores and entire surface of the fruit with the chemically treated solution. The fruit is then delivered onto the table or conveyor 30 and carries through the usual drier now well known in the art for drying preparatory to packing and shipment, or it may be conveyed into the combined drier, waxer and polisher forming the subject matter of my co-pending application filed simultaneously with the present application.

Following out this method of treatment with the primary washing of the entire surface of the fruit, through the use of a spray under pressure, it will be seen that all dirt from the pores and surface of the fruit is substantially removed by the pressure of the spray and all germs, molds, or spores killed by the chemical solution with which the fruit is treated so that the water or solution is prevented from becoming infected as well as the machinery.

The further second step of treatment in the portion of the machine 19 for spraying and scrubbing simultaneously, with the same chemical solution, fully insures the thorough impregnation of the solution in the pores of the fruit or vegetables and the treatment of the entire surface thereof so as to prevent infection of any portion of the fruit and thoroughly reach all spores or other decayed germs. It will thus be understood that the entire treatment of the fruit or vegetables in preparation for market, is through the chemically treated liquid and the apparatus for applying the same so that diseased fruits can in no way inoculate or affect the good fruit.

It is to be further understood that with this method of treatment there is no dirt or other deposits left upon the surface of the fruit which is passed onto the table or conveyor 30 ready for the dryer.

In order to carry out the method of operation above described, the machines as described, have been specially constructed for the purpose in order to utilize the treating solution in the most economical manner. This invention therefore further provides for the special treatment of the solution in the machine which includes the provision of receiving pans, 31 mounted below the outlet 17 and the end of the drip pan 22 for receiving all of the liquid and foreign matter from the washed fruit which is primarily strained through the screen 32 mounted in the receiving pans 31 as shown in Fig. 1 at the left hand side thereof so that all leaves and the larger particles of dirt, etc., are separated from the liquid and can be readily removed by removing the frame 33 carrying the screen from the receiving pans 31.

A suitable return pipe 34 carries the fluid from each of the receiving pans 31 into the settling tank 35 which forms the primary means for separating the solid content from the fluid. This primary settling tank 35 is provided with a plurality of inclined transversely extending plates 36 terminating in spaced relation with respect to the bottom as clearly shown in Fig. 1, said plates 36 being mounted in spaced relation and interposed between which are the inclined plates 37 extending upwardly from the bottom so that the liquid in passing from the lower to the rear end of this primary settling tank is caused to take a circuitous path up and down in the tank which has been found to cause the heavier particles contained in the liquid to settle out, as the flow through the container is substantially slow.

In the normal operation of the device, the primary settling tank 35 is normally substantially filled with liquid which is provided with an outlet at 38 immediately below which is the baffle plate 39 extending transversely between the sides of the settling tank as clearly shown in Fig. 1. The bottom portion of each pocket formed between the inclined plate 37 is provided with a sediment bowl 40, in the lower portion of which is a plug 41 to permit the ready cleaning of sediment from the pocket.

The end of the outlet pipe 38 from the primary settling tank is provided with a depending end 42 for discharging the treated fluid into the primary filter 43. Referring particularly to Fig. 4, as well as Fig. 1, the primary filter includes a cylindrical container 44 having an open upper end, the edge portion of which is perforated as indicated at 45. A flange 46 is secured to the periphery of the container 44 below the line of perforations as clearly shown in Fig. 4, and forms an annular receiving chamber for the liquid discharge from the container which is conveyed and discharged outwardly from the spout 47. An inlet pipe 48 is mounted concentrically in the container 44 and has the lower end thereof provided with perforations 49 the depending end 42 discharging the liquid from the primary separating tank into the pipe 48 which is filled at the bottom with gravel as indicated at 50 in Fig. 1.

The annular space surrounding the pipe 48 and within the container 44 is filled with a suitable porous packing material designed for filtering the liquid passing upwardly therethrough and extracting dust and dirt particles therefrom in order to thoroughly clean the liquid in condition for re-use in treating more fruit. The upper edge of the container 44 receives a suitable cover 51 removably placed thereon in any desired manner.

The spout 47 of the primary filter 43 discharges the liquid into the supply tank 52 which is open at the top and is provided with a plurality of vertically extending transverse walls 53 terminating in spaced relation with respect to the bottom of the tank while intermediate these walls 53 are a plurality of partitions 54 extending upwardly from the bottom so that the liquid in the supply tank will take a circuitous path in passing from the end adjacent the spout 47 to the opposite end thereof. This will permit any remaining dirt or foreign matter to settle out of the liquid through the slow movement thereof through the supply tank which may be removed from the basin 55 provided with the removable plugs 56 when desired.

A suitable supply pipe 57 is positioned in the pocket 58 in the supply tank to provide a suitable screen inlet end as designated at 59 so that the liquid from the supply tank may be pumped through the pipe 57 by the pump 60 operated in any suitable manner for supply to the spray nozzle of the treating machine. This pump 60 will supply the fluid under pressure which if desired, may be pumped through the pipe 61 to the pressure filter 62 which is of any desired form well known in the art to thoroughly and finally filter the liquid which is then conducted by the pipe 63 to the supply pipe 12 and 28 for spraying on the fruit being treated. This spraying will be under any desired pressure at which the pump operates and if it is desired, the pressure filter 62 may be rendered inoperative by the proper control of the valves 64 and 65 respectively to permit the liquid to be pumped through the by-pass connection 66.

In this connection, it has been found that in some localities the fruit has considerably more finely divided dust and dirt adhering thereto than in other localities which it is difficult to separate from the liquid and requires the use of the pressure filters to thoroughly cleanse the solution. In the majority of localities, however, the process may be carried on without the use of the pressure filter in which case the liquid is by-passed through the pipe 66 and directly supplied to the spray nozzle from the pump.

The primary settling tank and the secondary or supply tank 52 provides for an efficient settling treatment of the liquid in cooperation with the primary filter 43 in order that it may be frequently re-used and continuously circulated through the operation of the pump 60 for treating a large amount of fruit as above stated. The construction of the primary settling tank, the primary filter, and the supply and storage tanks, all form novel features of this invention together with the method of treating the fluid for re-use in the washing and scrubbing machine.

It should therefore be fully understood from the above description that a new composition for the treatment of fruits and vegetables particularly citrus fruits has been provided by this invention together with special methods of treating the fruits with this solution and treating the solution together with the special structure of the apparatus in order to form an economical system of treating fruits for preparation for marketing.

Having thus described my invention, what I claim as new is:—

A composition for treating fresh fruits and vegetables for market to prevent destructive decay, comprising borax, sodium bicarbonate, sodium carbonate, potassium permanganate and copper sulphate, the borax being present in a greater percentage than the other ingredients combined, and the remaining ingredients being present in successively diminishing proportions in the order stated.

In testimony whereof I affix my signature.

HENRY GRADY ZELLNER.